United States Patent
Pallapotu

(10) Patent No.: US 7,801,922 B2
(45) Date of Patent: Sep. 21, 2010

(54) FILE INDEX PROCESSING

(75) Inventor: Ramesh Pallapotu, Sunnyvale, CA (US)

(73) Assignee: EMC Corporation, Hopkinton, MA (US)

(*) Notice: Subject to any disclaimer, the term of this patent is extended or adjusted under 35 U.S.C. 154(b) by 412 days.

(21) Appl. No.: 10/956,482

(22) Filed: Sep. 30, 2004

(65) Prior Publication Data

US 2006/0085481 A1  Apr. 20, 2006

(51) Int. Cl.
    *G06F 17/30* (2006.01)
(52) U.S. Cl. ..................................... 707/797
(58) Field of Classification Search .......... 707/2, 707/3, 4, 6, 8, 10, 100, 101, 102, 103 R, 200, 707/204, 205, 609, 705, 786, 797, 798, 802; 370/392; 709/226, 229
    See application file for complete search history.

(56) References Cited

U.S. PATENT DOCUMENTS

| 5,870,747 | A | 2/1999 | Sundaresan |
| 6,061,692 | A | 5/2000 | Thomas et al. |
| 6,381,605 | B1 | 4/2002 | Kothuri et al. |
| 6,427,123 | B1 * | 7/2002 | Sedlar ............................ 702/2 |
| 6,513,028 | B1 | 1/2003 | Lee et al. |
| 6,591,269 | B1 * | 7/2003 | Ponnekanti .................. 707/100 |
| 7,165,082 | B1 * | 1/2007 | DeVos ......................... 707/203 |
| 2003/0033285 | A1 * | 2/2003 | Jalali et al. ..................... 707/1 |

FOREIGN PATENT DOCUMENTS

EP    0774715    5/1997

OTHER PUBLICATIONS

Bayer et al., Organization and Maintenance of Large Ordered Indexes, 1972, Acta Informatica, pp. 173-189.*
Douglas Corner, The Ubiquitos B-Tree, Jun. 1979, Computing Surveys, vol. 11, No. 2, pp. 121-137.*
Ooi et al., Index nesting—an efficient approach to indexing in object-oriented databases, 1996, The VLDB Journal, pp. 215-228.*
Chong et al., B+—Tree Indexes with Hybrid Row Identifiers in Oracle8i, IEEE, pp. 341-348.

* cited by examiner

*Primary Examiner*—Fred I Ehichioya
(74) *Attorney, Agent, or Firm*—Van Pelt, Yi & James LLP

(57) ABSTRACT

According to some embodiments, a technique for processing an index comprises receiving an index, wherein the index includes a path, and wherein the path includes an element; determining whether the path element is associated with an identifier; and associating an identifier with the path element if the path element is determined to not be associated with an identifier.

18 Claims, 6 Drawing Sheets

FILE INDEX PROCESSING

FIELD OF THE INVENTION

The present invention relates to computer environments, more specifically to data backup.

BACKGROUND OF THE INVENTION

It is a common practice to back up data in a computer environment. When the data is backed up to a backup medium, such as a tape drive or a hard drive, additional information, herein referred to as the index, can also be delivered from the computer system which is backing up its data. The index provides information about the data that is being backed up, such as how the backup data is organized. The index is often received in a random order and the received index typically needs to be reorganized. For a large number of indexes, the organization of the index at the end of the backup, can take a very long time and consume high system resources. It would be desirable to be able to organize the index in a way that avoids the extremely long time periods typically required to rebuild the index.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
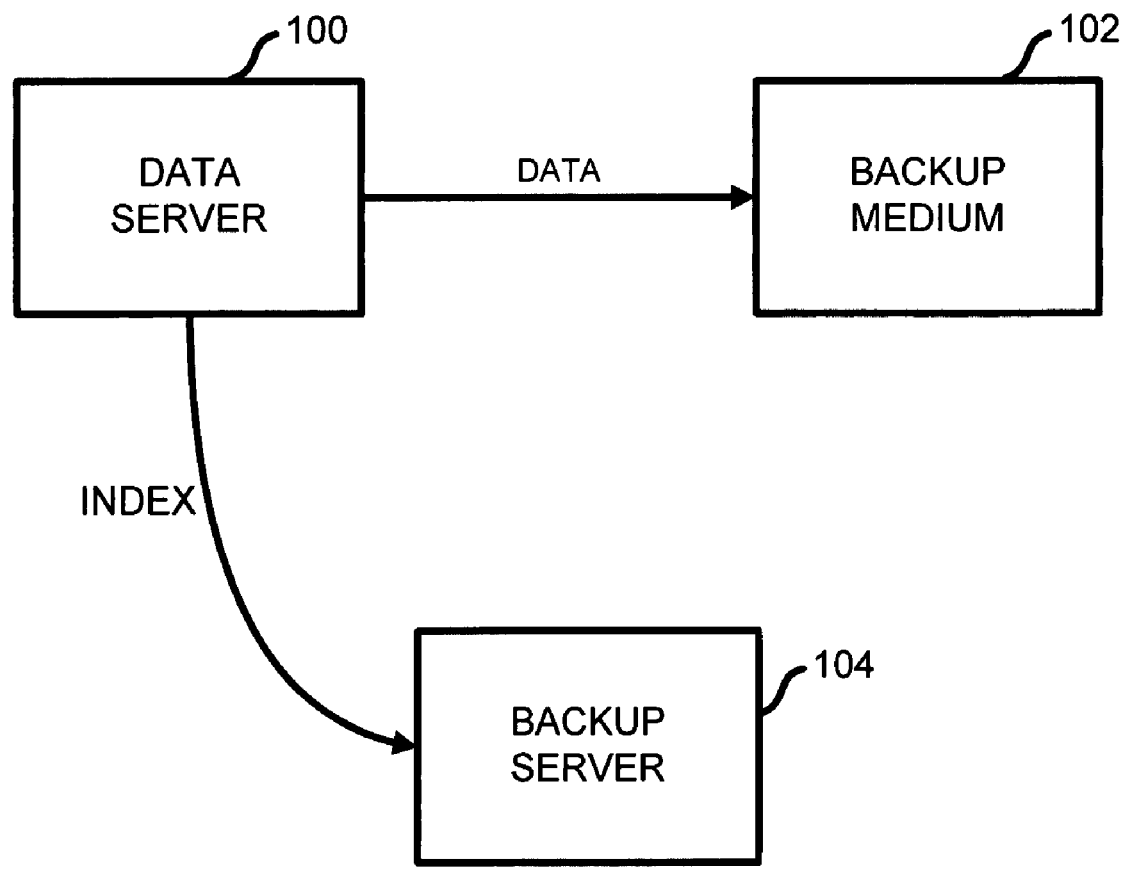
FIG. 1 is a block diagram of a system suitable for executing the invention.

FIG. 1 is a block diagram of a system suitable for executing the invention. In this example, a data server 100 is shown to send data to a backup medium 102. The data server 100 also sends the index to backup server 104.

Figure 2A:
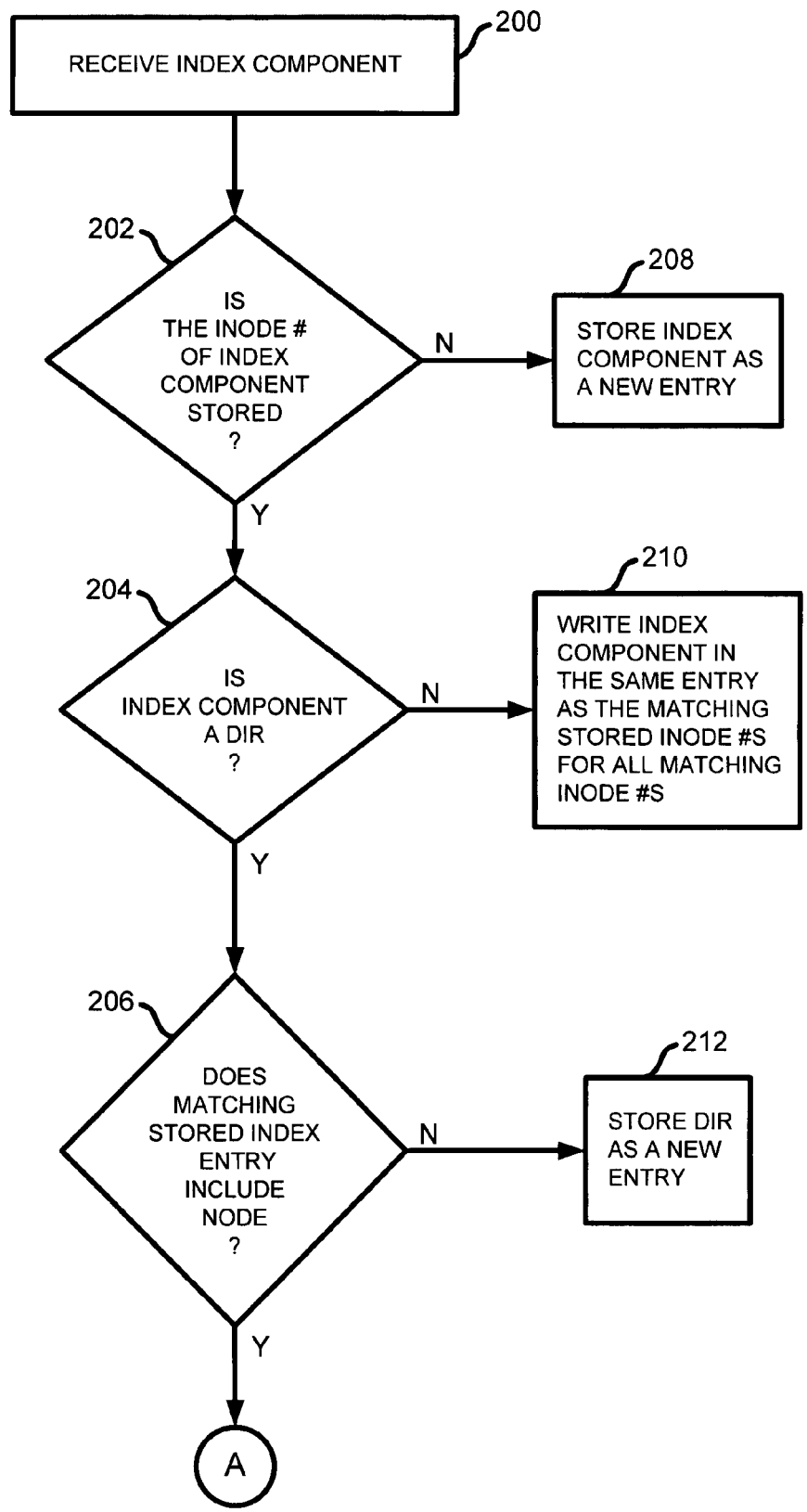
FIGS. 2A-2B are flow diagrams of a method according to some embodiments for processing an index.
Figure 2B:
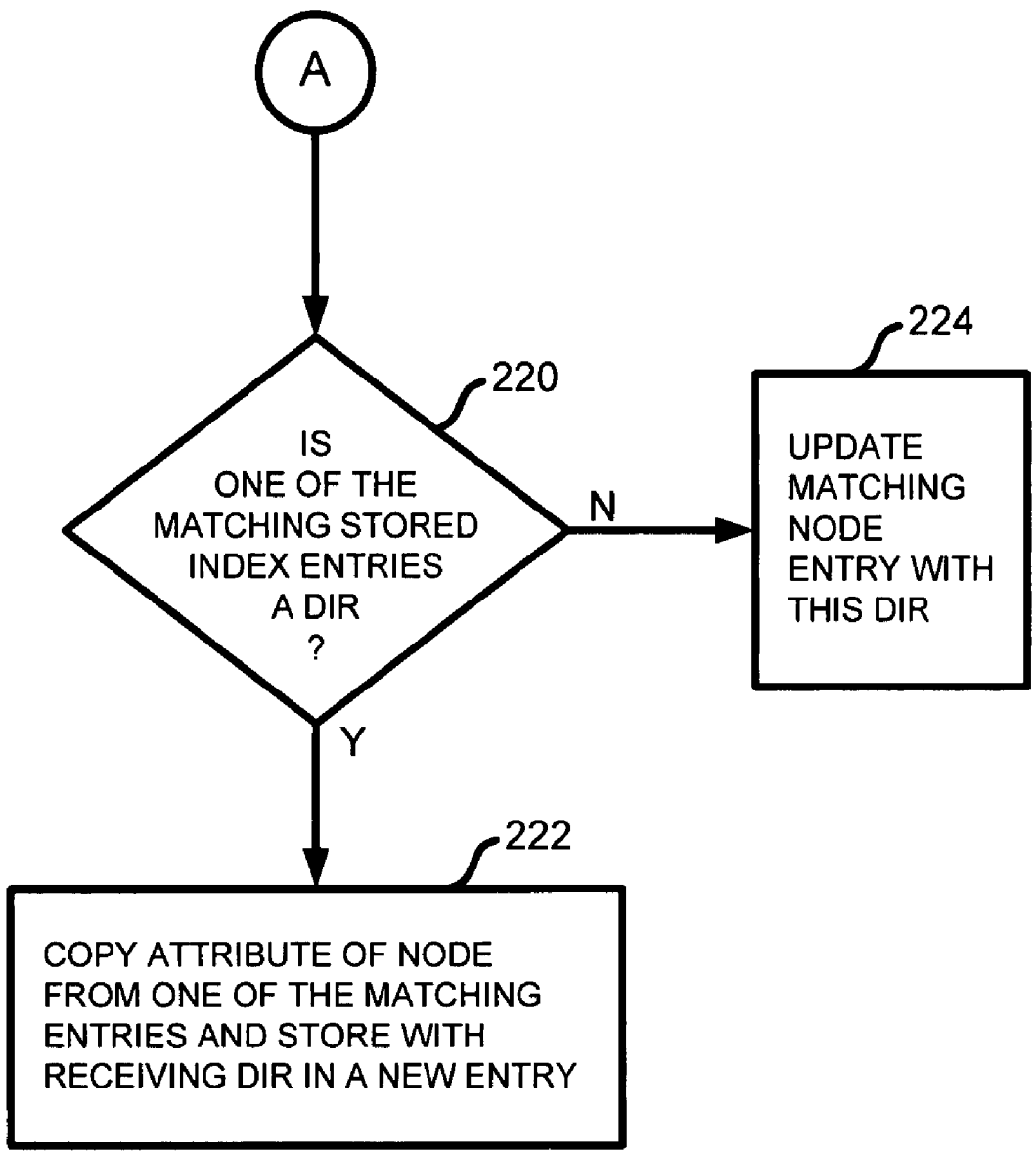

FIG. 2 is a flow diagram of a method according to some embodiments for processing an index. In this example, an index is received in pieces. For example, an index for a particular piece of data may have a DIR component and a NODE component, wherein the DIR includes an inode number, parent inode number, and name of the index. In this embodiment, the inode number is a unique number identifying the index. The NODE component of the index also includes the inode number that matches the DIR inode number, as well as index attributes, such as stat info. Examples of stat info include information about the index such as size, type, permissions, creation and modification date.

In this example, an index component is received (200). An index component as used herein is a portion of an index, such as a DIR component or a NODE component. It is then determined whether the inode number of the index component is already stored (202). In one embodiment, the inode number is stored in an on-disk balancing tree structure such as a B+ tree. The B+ tree structure can be used in conjunction with a search library, such as WISS from Legato, Inc., a division of EMC. In some embodiments, an inode number can be a unique number identifying an index and all of the index components of that index are associated with that number.

If the inode number of this particular index is not found to be stored, then the received index component is stored as a new entry (208). For example, if a NODE component is received and inode number of this particular index is not found to be stored in the balancing tree on disk, then this received component is stored in the balancing tree as a new entry.

If the inode number of this particular index is found to be stored, then it is determined whether the received index component is a DIR (204). If it is not a DIR, then it is assumed to be a NODE component and it is written in the same entry as the matching stored inode numbers for all matching inode numbers (210). If the received index component is a DIR (204), then it is determined whether the matching stored index entry includes a NODE (206). If not, then the received DIR is stored as a new entry (212).

If the matching stored index entry includes a NODE (206), then it is determined whether one of the matching stored index entries is a DIR (220). If no DIR components with the matching inode number are already stored but there is a NODE entry, then the matching NODE entry is updated with this received DIR component (224). If, however, one of the matching stored index entries is a DIR (220), then the NODE attribute is copied from one of the matching entries and stored with the receiving DIR component in a new entry (222).

Figure 3:
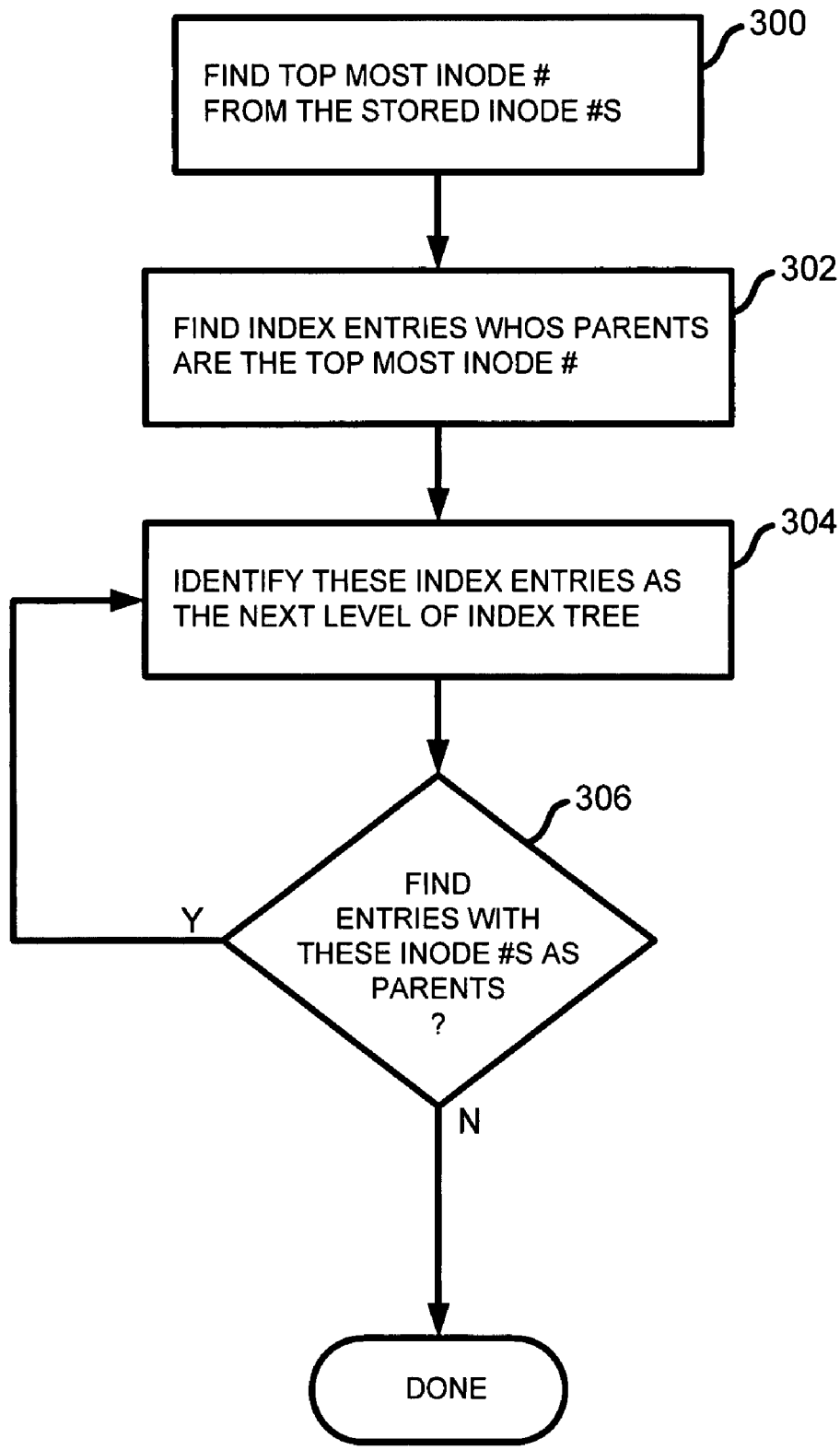
FIG. 3 is a flow diagram of a method for processing an index according to some embodiments.

FIG. 3 is a flow diagram of a method for processing an index according to some embodiments. In this example, the pieces of the indexes have been restructured, stored in the balancing tree as index entries, and the index tree is being reconstructed. FIG. 3 is best understood when discussed in conjunction with FIG. 4.

Figure 4:
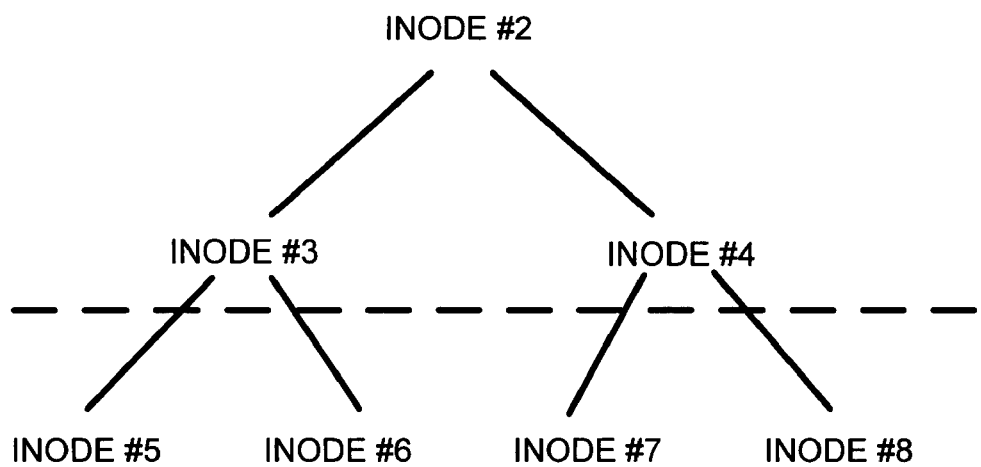
FIG. 4 is an example of a index tree as discussed in conjunction to FIG. 3 with index entries identified by inode numbers according to some embodiments.

FIG. 4 is an example of an index tree as discussed in conjunction with FIG. 3, with indexes identified by inode numbers according to some embodiments. In this example, the tree is shown to include an index structure with the top index having the inode number 2. Indexes with inode numbers 3 and 4 are shown to be the children of the inode number 2; and inode numbers 5, 6, 7, and 8 being the children of inode numbers 3 and 4. Inode number 2 is herein referred to as the parent of inode number 3 and inode number 4; and inode number 3 is referred to as the parent of inode number 5 and inode number 6. In this example, inode number 2 can be a directory which includes a directory with inode number 3 and another directory with inode number 4. Inode number 3 is a directory with a file having the inode number 5 and another file having the inode number 6.

In the example shown in FIG. 3, the topmost inode number is found from the stored inode numbers (300). For example, it can be predetermined that the topmost inode number in the tree is inode number 2. Accordingly, a search can be performed in the balancing tree, such as a B+ tree, to find inode number 2.

Index entries whose parents are the topmost inode number are then found (302). For example, in the example shown in FIG. 4, the indexes whose parents are the topmost inode number is inode number 3 and inode number 4. Accordingly, a search can be performed in the balancing tree based on parent information to find the index entries with parent equaling inode number 2. In some embodiments, the parent inode number is stored in the DIR component of the index.

These index entries are identified as the next level of the index tree (304). It is then determined whether there are entries with these inode numbers as parents (306). If there are no index entries with these inode numbers as parents, then the restructuring is complete. If, however, there are entries with these inode numbers as parents, then the newly discovered index entries are identified as the next level of the index tree (304).

Figure 5:
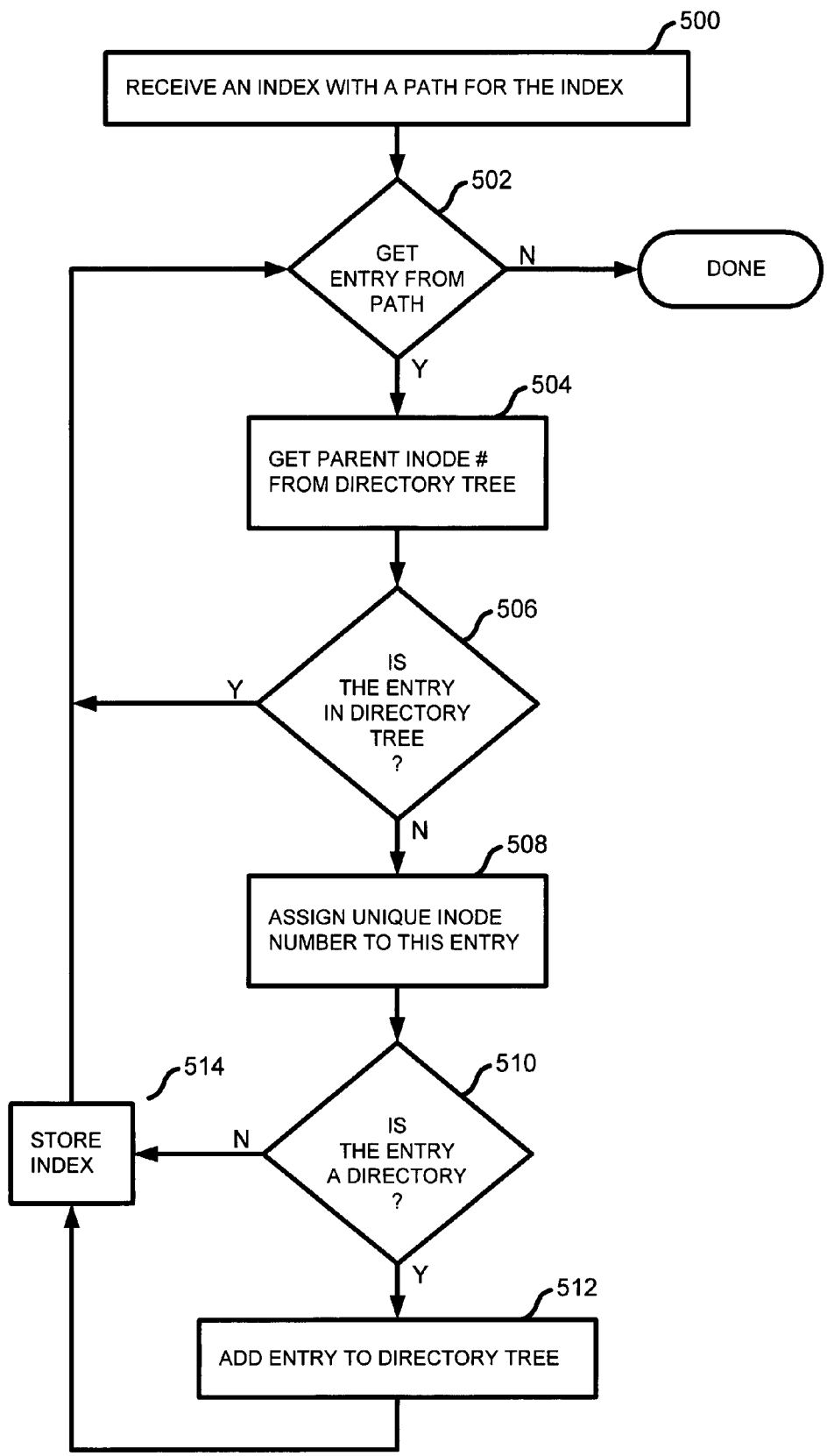
FIG. 5 is a flow diagram of a method for index processing according to some embodiments.

FIG. 5 is a flow diagram of a method for index processing according to some embodiments. In this example, the index is delivered from the data server to the backup server in a single piece rather than receiving multiple pieces of an index. Here, the inode number is not received, rather the path of the index is received. For example, index d can be received with the path of a|b/c/d, where c is the parent of d, b is the parent of c, and a is the parent of b. In addition, another index d, along with its path, can be received, where index d is not the same as index d. A file with the same name can occur under different directories for example a/c/b/d, where these files do not have the same path. Accordingly, a search by name, such as d, is not in helpful in this example. In some embodiments, a pseudo inode number is generated for the entries in the path. In some embodiments, this inode number is unique. A directory tree can be generated in memory which includes the index name, its assigned inode number, and its parent's assigned inode number such that a quick search can be performed by searching for either the inode number or the parent inode number.

In the example shown in FIG. 5, an index is received with a path for the index, such as a/b/c/d (500). It is determined whether a path entry is retrieved from the path (502). If a path entry is not retrieved from the path, then the process is complete. If a path entry, such as "b", is retrieved from the path, then the parent inode number is retrieved from a directory tree (504). The directory tree includes a list of directories. In some embodiments, the directory tree is stored in memory while the index tree is stored on disk. It is then determined whether the path entry is in the directory tree (506). If the path entry is already in the directory tree, then the next entry is retrieved from the received path (502). In some embodiments, the path entries are retrieved from left to right—from parent to child—such as a, then b, then c, then d in the example of a path a/b/c/d.

If the path entry is not in the directory tree (506), then a unique inode number is assigned to this path entry (508) in this example. It is determined whether the path entry is a directory (510). In some embodiments, files are not saved in the directory tree while directories are saved. Directories have at least one child while files do not. If the path entry is a directory, then it is added to the directory tree (512). In some embodiments, the directory name, its assigned inode number and its parents assigned inode number are stored in the directory tree. For example, if the path a/b/c/d has been received for index "d", and "c" has been assigned the inode number 4 and "d" is assigned inode number 5, then "d"'s parent inode number is 4. Whether the path entry is added to the directory tree (512) or the path entry is a directory (510), the index is stored in the balance tree on disk (514). The next path entry is then retrieved (502) if one is available.

Thereafter, the index tree can be rebuilt in some embodiments according to a method similar to that exemplified in FIG. 3. In this embodiment, the directory tree stored in memory is searched rather than the balancing tree to find the inode numbers and parent inode numbers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing an index comprising:
receiving for a node in a file system hierarchy: (1) an index that includes one or more properties of data located at the node in the file system hierarchy and (2) a path, comprising one or more path elements in the file system hierarchy, at which the node is located within the file system hierarchy; and
for each of the one or more path elements included in the received path:
using a processor to determine whether a path element being processed has been encountered previously, including by accessing a directory tree in which previously encountered directories are stored;
in the event it is determined that the path element being processed has not been encountered previously:
using the processor to add the path element being processed to the directory tree; and
assigning a unique identifier to the path element which has not been previously encountered, wherein the identifier assigned to the path element being processed includes an inode number; and
in the event it is determined that the path element being processed has been encountered previously, using the processor to obtain a next path element in the received path without adding the path element being processed to the directory tree.

2. The method of claim 1, wherein adding the path element being processed to the directory tree includes storing for the path element being processed: (1) the identifier assigned to the path element which has not been previously encountered and (2) an identifier of a parent of the path element being processed.

3. The method of claim 2, wherein adding the path element being processed to the directory tree further includes storing for the path element being processed: (3) a directory name of the path element which has not been previously encountered.

4. The computer program product of claim 1, wherein adding the path element being processed to the directory tree includes storing for the path element being processed: (1) the identifier assigned to the path element which has not been previously encountered and (2) an identifier of a parent of the path element being processed.

5. The computer program product of claim 4, wherein adding the path element being processed to the directory tree further includes storing for the path element being processed: (3) a directory name of the path element which has not been previously encountered.

6. The method of claim 1, wherein accessing the directory tree to determine whether the path element being processed has been encountered previously includes searching the directory tree for an identifier assigned to a parent of the path element being processed.

7. The method of claim 1, wherein accessing the directory tree to determine whether the path element being processed has been encountered previously includes searching the directory tree for an identifier assigned to the path element being processed.

8. The method of claim 1, wherein the one or more properties included in the index include one or more of the following: a size, a type, a permission, a creation date, or a modification date.

9. A system of processing an index comprising:
a processor configured to:
receive for a node in a file system hierarchy: (1) an index that includes one or more properties of data located at the node in the file system hierarchy and (2) a path, comprising one or more path elements in the file system hierarchy, at which the node is located within the file system hierarchy; and
for each of the one or more path elements included in the received path:
determine whether a path element being processed has been encountered previously, including by accessing a directory tree in which previously encountered directories are stored;
in the event it is determined that the path element being processed has not been encountered previously:
add the path element being processed to the directory tree; and
assign a unique identifier to the path element which has not been previously encountered, wherein the identifier assigned to the path element being processed includes an inode number; and
in the event it is determined that the path element being processed has been encountered previously, obtain a next path element in the received path without adding the path element being processed to the directory tree; and
a memory coupled with the processor, wherein the memory provides the processor with instructions.

10. The system of claim 9, wherein the processor is configured to add the path element being processed to the directory tree by storing for the path element being processed: (1) the identifier assigned to the path element which has not been previously encountered and (2) an identifier of a parent of the path element being processed.

11. The system of claim 10, wherein the processor is further configured to add the path element being processed to the directory tree by storing for the path element being processed: (3) a directory name of the path element which has not been previously encountered.

12. The system of claim 9, wherein the processor is configured to access the directory tree to determine whether the path element being processed has been encountered previously by searching the directory tree for an identifier assigned to a parent of the path element being processed.

13. The system of claim 9, wherein the processor is configured to access the directory tree to determine whether the path element being processed has been encountered previously by searching the directory tree for an identifier assigned to the path element being processed.

14. The system of claim 9, wherein the one or more properties included in the index include one or more of the following: a size, a type, a permission, a creation date, or a modification date.

15. A computer program product for processing an index, the computer program product being embodied in a computer readable storage medium and comprising computer instructions for:
receiving for a node in a file system hierarchy: (1) an index that includes one or more properties of data located at the node in the file system hierarchy and (2) a path, comprising one or more path elements in the file system hierarchy, at which the node is located within the file system hierarchy; and
for each of the one or more path elements included in the received path:
determining whether a path element being processed has been encountered previously, including by accessing a directory tree in which previously encountered directories are stored;
in the event it is determined that the path element being processed has not been encountered previously:
adding the path element being processed to the directory tree; and
assigning a unique identifier to the path element which has not been previously encountered, wherein the identifier assigned to the path element being processed includes an inode number; and
in the event it is determined that the path element being processed has been encountered previously, obtaining a next path element in the received path without adding the path element being processed to the directory tree.

16. The computer program product of claim 15, wherein the computer instructions for accessing the directory tree to determine whether the path element being processed has been encountered previously include computer instructions for searching the directory tree for an identifier assigned to a parent of the path element being processed.

17. The computer program product of claim 15, wherein the computer instructions for accessing the directory tree to determine whether the path element being processed has been encountered previously include computer instructions for searching the directory tree for an identifier assigned to the path element being processed.

18. The computer program product of claim 15, wherein the one or more properties included in the index include one or more of the following: a size, a type, a permission, a creation date, or a modification date.

* * * * *